N. T. CLINE.
AIR STRAINER FOR AIR COMPRESSORS.
APPLICATION FILED APR. 4, 1916.
1,233,844.
Patented July 17, 1917.
2 SHEETS—SHEET 1.
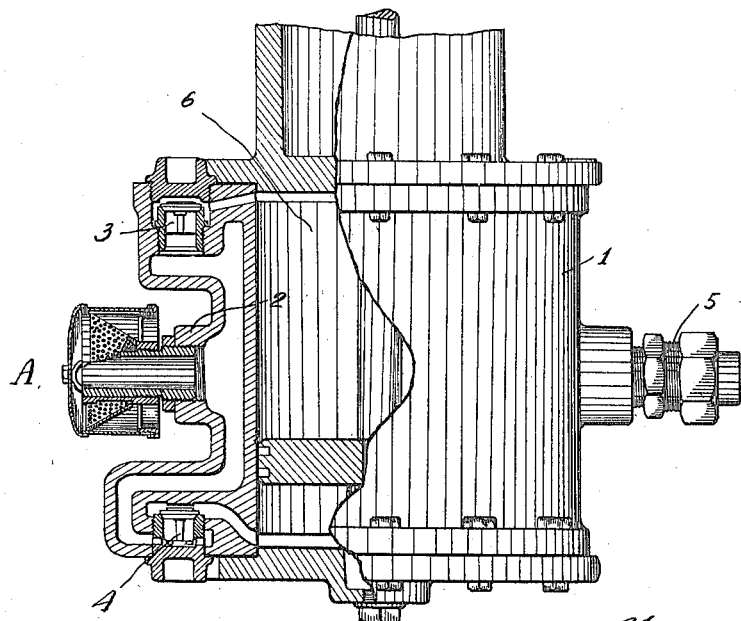
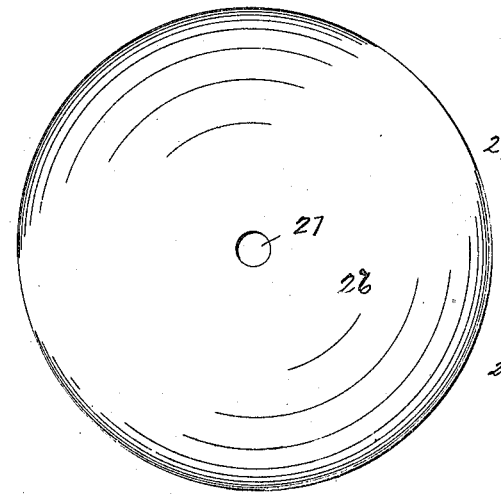
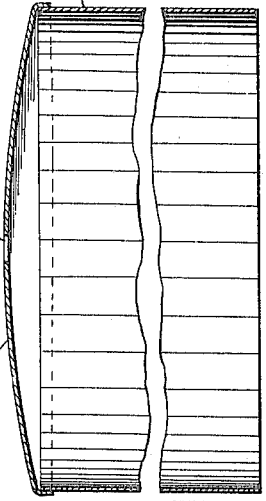
WITNESSES
INVENTOR
Nelson T. Cline
By Max H. Srolovitz
ATTORNEY

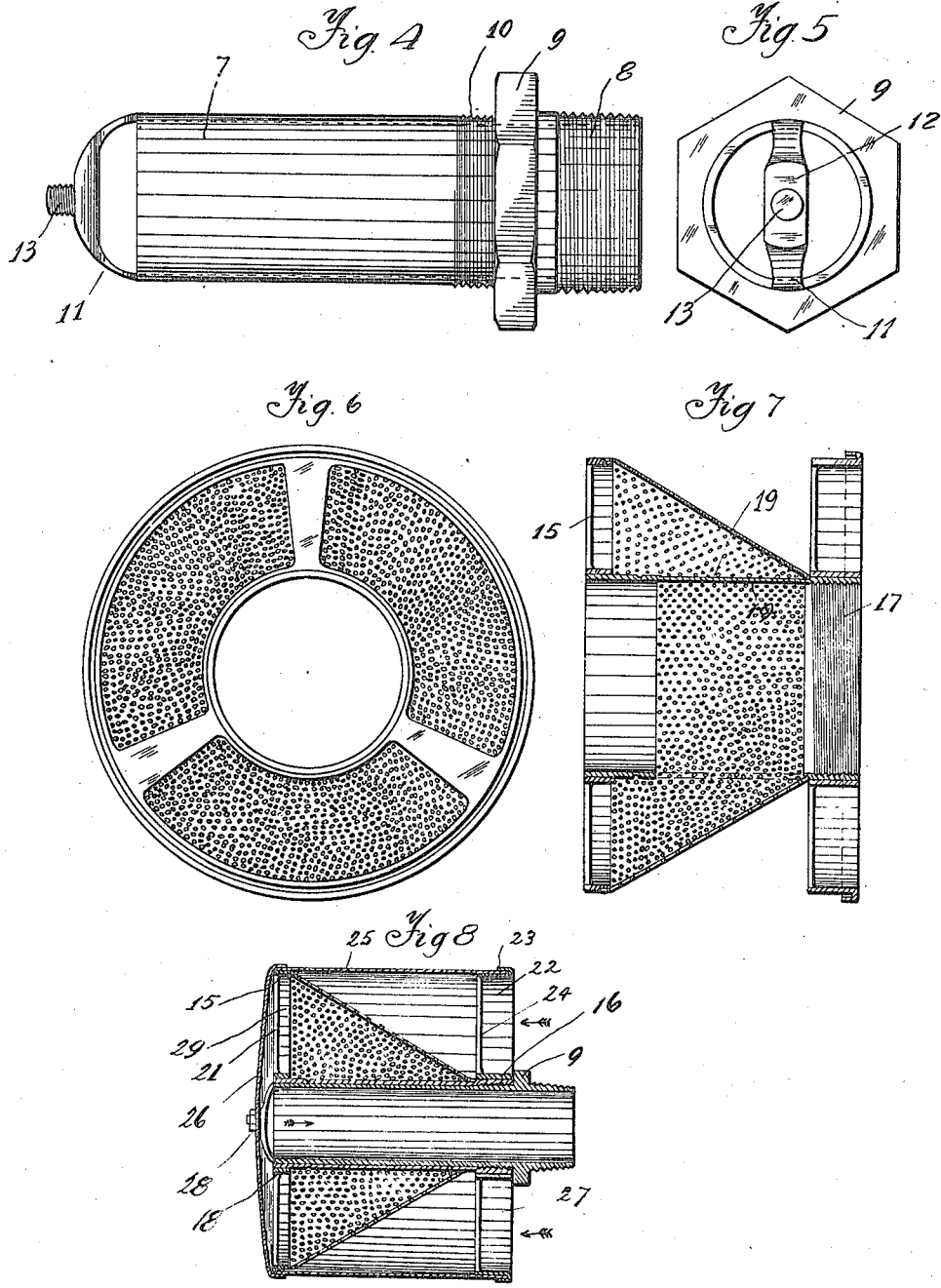

UNITED STATES PATENT OFFICE.

NELSON T. CLINE, OF PITTSBURGH, PENNSYLVANIA.

AIR-STRAINER FOR AIR-COMPRESSORS.

1,233,844.      Specification of Letters Patent.      Patented July 17, 1917.

Application filed April 4, 1916. Serial No. 88,802.

*To all whom it may concern:*

Be it known that I, NELSON T. CLINE, a citizen of the United States, residing at Pittsburgh, in the county of Allegheny and State of Pennsylvania, have invented certain new and useful Improvements in Air-Strainers for Air-Compressors, of which the following is a specification.

This invention relates to an air strainer for air-compressors and has for its object to provide a strainer of such type, in a manner as hereinafter set forth, with means to prevent foreign substances, such as sand, coal, ashes, dust, etc., which is always present around locomotives, entering the compression chamber of the compressor, under such conditions not impairing the operation of the compressor, which would be the case if foreign substances entered the air cylinder as they naturally cause rapid wear of the working parts and destroy the efficiency of the compressor.

A further object of the invention is to provide an air strainer for air-compressors, having the strainer element inclosed in a casing thus preventing any dust or dirt coming in direct contact with the strainer element under such conditions insuring the meshes of the strainer element being open at all times.

As is well known air-compressors, or as a rule, when used in connection with railroad rolling stock, are positioned on a locomotive where they are exposed to steam and rain causing condensation of the steam and allows water to enter into the compression chamber and from there conducted to the brake valve and triples causing these latter to become defective in operation. The objection just stated is overcome by an air strainer in accordance with this invention, as the strainer element is shielded from water owing to it being protected by an inclosing casing thus making the strainer absolutely water-proof.

A further object of the invention is to provide, in a manner as hereinafter set forth, an air strainer for air-compressors, having means to prevent oil from being drawn into the compression chamber of the compressor through the strainer for the purpose of lubricating parts as this has been found to be very injurious to the working parts of the compressor, causing the walls of the air ports to corrode and obstructing the free passage of air which will cause a compressor to run hot thereby losing its efficiency. To overcome this objection the strainer includes an inlet tube which extends out through the center of the strainer element and any substance entering the strainer would have to be lifted up by force of suction in order to enter the inlet tube and further conducted to the compression chamber of the compressor.

Further objects of the invention are to provide an air strainer for air-compressors which is simple in its construction and arrangement, strong, durable, efficient and convenient in its use, readily set up with respect to the compressor, and inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a sectional elevation of a portion of an air compressor showing the adaptation therewith of an air strainer in accordance with this invention.

Fig. 2 is a top plan view of the protecting casing.

Fig. 3 is a longitudinal sectional view of the casing.

Fig. 4 is a side elevation, and Fig. 5 is an end view of the inlet tube or pipe.

Fig. 6 is an elevation and Fig. 7 a longitudinal sectional view of the strainer element.

Fig. 8 is a longitudinal sectional view of the strainer.

Referring to the drawings in detail 1 denotes an air-compressor and 2 the inlet. The inlet-valves are indicated at 3, 4. The outlet at 5. The form of compressor illustrated in Fig. 1 is of a type now in general use.

As illustrated in Fig. 1 the air strainer, which is referred to generally by the reference character A is connected with the inlet 2 so as to extend at right angles with respect to the compression chamber 6, but it is to be understood that the strainer A can be connected to the inlet at an angle with respect thereto, or in any suitable position.

The air strainer A, in accordance with this invention, consists of an air conducting or inlet pipe 7, having its rear end peripherally threaded as at 8 whereby said pipe 7 can be detachably connected with the inlet 2 of the compressor. The pipe 7 has a boss 9 which limits the inward movement of the pipe when connecting it with the compressor. Preferably when the pipe 7 is connected with the nipple which forms the inlet 2 the boss 9 abuts against said nipple, or at one side of the boss 9. The pipe 7 has peripheral threads 10 for a purpose to be presently referred to. The forward end of the pipe 7 has formed integral with the edge thereof a curved strap or arm 11 having an enlarged central portion 12 formed with a flat outer face. Carried by the enlarged central portion 12 of the strap 11 is a threaded stem 13 which is employed for a purpose to be presently referred to.

The reference character 14 denotes a frusto-conical strainer element perforated throughout and having formed integral with its enlarged end an imperforate annular member 15. Connected with the smaller end of the element 14 is an imperforate collar 16 provided with interior threads 17 which are adapted to engage in the threads 10 whereby the strainer element is connected with the pipe 7 and when in such position the collar 16 abuts against the boss 9. When the strainer element 14 is connected with the pipe 7 it surrounds said pipe and the latter is disposed centrally with respect to said element 14. The length of the element 14, with respect to the pipe 7, is such that when the element 14 is connected with said pipe, the member 15 is flushed with the forward end of the pipe 7, as clearly illustrated in Fig. 8.

Arranged within the strainer element is a collar 18, which is positioned in alinement with the collar 16 and is adapted to surround the forward end of the pipe 7, as well as being flush therewith, when the strainer element is mounted in the position shown in Fig. 8. The collar 18 is connected with the collar 16 by longitudinally extending narrow bracing arms 19, and said collar 18 is connected with the annular member 15, by radially disposed bracing arms 21.

Surrounding the collar 16 is an annular supporting member 22 having an annular peripheral shoulder 23. The member 22 is connected with the collar 16 by radially disposed bracing arms 24.

The pipe 7 is of greater length than the length of the strainer element 14 and the rear end of said pipe 7 projects from the strainer element the desired distance so that said pipe can be coupled with the nipple which forms the inlet 2.

The strainer element 14 is inclosed by a cylindrical protecting casing 25 which is closed at its outer end as at 26, and open at its inner end as at 27. The open inner end of the casing 25 provides an inlet to the strainer. When the casing 25 is mounted in position it engages the periphery of the member 15 and also the periphery of the member 22 abuts against the shoulder 23. The inner diameter of the casing 25 with respect to the diameter of the members 15, 22, is such that when the casing is mounted in position it will frictionally engage with the periphery of said members 15, 22, whereby accidental displacement of the casing 25 when mounted in position is prevented.

The closed end 26 of the casing 25 has a centrally disposed opening 27 through which extends the threaded stem 13 and mounted upon said stem, after it passes through the opening 27, is a nut 28, whereby the casing is connected with the pipe 7. The strap 11 maintains the close end 26 of the casing 25 spaced from the forward end of the pipe 7.

When the casing 25 is mounted in position, said strainer element 14, in connection with the closed end 26 of the casing 25, provides an air chamber 29, with which communicates the forward end of the pipe 7.

Air entering the strainer at the inlet 27 passes through the strainer element 14 and into the chamber 29 and further into the pipe 7, and is then conducted to the inlet of the compressor. The direction of travel of the air is indicated by the arrows, Fig. 8.

By setting up the conducting pipe, strainer element and casing, in the manner as stated, the various parts of the strainer can be conveniently separated and the strainer cleaned when occasion so requires.

The casing 25 acts as a means to prevent foreign substance hitting the strainer element damaging the same.

In view of the manner in which the strainer is set up there is no necessity for the employment of screws, bolts or rivets to become broken or corroded and the strainer can be applied to the compressor in the same way as an ordinary strainer and furthermore can be connected to any type of air-compressor now in use on locomotives, or to any air-compressor that strainers are employed with. The casing 26 prevents any dust or dirt coming directly in contact with the strainer element under such conditions insuring the meshes of the strainer element being open at all times and as the air conducting tube is disposed centrally of the strainer it is obvious that foreign matter entering the casing would have to be lifted up before it can be forced into the conducting pipe.

What I claim is:—

1. An air strainer for air compressors comprising an air conducting pipe adapted to be connected at its rear end with an inlet of the compressor, a protecting casing surrounding said pipe, closed at its outer end and open at its inner end, and a frusto-conical strainer element interposed between said pipe and casing and having its forward end engaging the inner face of said casing near the forward end of the latter, said strainer element having its rear or smaller end connected with the outlet-end of the pipe, a collar secured to the inner end of said element, and means connected with, spaced from and surrounding said collar for supporting the rear end of said casing.

2. An air strainer for air compressors comprising an air conducting pipe adapted to be connected at its rear end with an inlet of the compressor, a protecting casing surrounding said pipe, closed at its outer end and open at its inner end, and a frusto-conical strainer element interposed between said pipe and casing and having its forward end engaging the inner face of said casing near the forward end of the latter, said strainer element having its rear or smaller end connected with the outlet-end of the pipe, a collar secured to the inner end of said element, and means connected with, spaced from and surrounding said collar for supporting the rear end of said casing, and means carried by the forward end of the pipe and connected with the closed end of the casing for supporting the forward end of the casing.

3. An air strainer for air compressors comprising an air conducting pipe adapted to be connected at its rear end with an inlet of the compressor, a protecting casing surrounding said pipe, closed at its outer end and open at its inner end, and a frusto-conical strainer element interposed between said pipe and casing and having its forward end engaging the inner face of said casing near the forward end of the latter, said strainer element having its rear or smaller end connected with the outlet-end of the pipe, a collar secured to the inner end of said element, and means connected with, spaced from and surrounding said collar for supporting the rear end of said casing, and means carried by the forward end of the pipe and connected with the closed end of the casing for supporting the forward end of the casing, and means for surrounding the forward end of said pipe and connected with the forward end of said element for supporting said forward end.

4. An air strainer for air compressors comprising an air conducting pipe adapted to be connected at its rear end with an inlet of the compressor, a protecting casing surrounding said pipe, closed at its outer end and open at its inner end, and a frusto-conical strainer element interposed between said pipe and casing and having its forward end engaging the inner face of said casing near the forward end of the latter, said strainer element having its rear or smaller end connected with the outlet-end of the pipe, means mounted upon the forward end of the pipe and connected with the forward end of said element for supporting said forward end, a collar secured to the inner end of said element, and means connected with, spaced from and surrounding said collar for supporting the rear end of said casing.

5. An air strainer for air compressors comprising an air conducting pipe adapted to be connected at its rear end with an inlet of the compressor, a protecting casing surrounding said pipe, closed at its outer end and open at its inner end, and a frusto-conical strainer element interposed between said pipe and casing and having its forward end engaging the inner face of said casing near the forward end of the latter, said strainer element having its rear or smaller end connected with the outlet-end of the pipe, means exteriorly of said element for supporting the rear end of said casing, and means within the forward end of said element for supporting the forward end of said casing, and means projecting from the forward end of said pipe and extending through the closed end of the casing for connecting the pipe therewith.

In testimony whereof I affix my signature in the presence of two witnesses.

NELSON T. CLINE.

Witnesses:
LUELLA H. SIMON,
H. SROLOVITZ.